United States Patent [19]

Regunathan et al.

[11] Patent Number: 4,759,474

[45] Date of Patent: Jul. 26, 1988

[54] BEVERAGE DISPENSING SYSTEM AND FILTER CARTRIDGE THEREFOR

[75] Inventors: Perialwar Regunathan, Wheaton; John W. Tadlock, West Chicago; Gregory L. Johnson, Wheaton, all of Ill.

[73] Assignee: Everpure, Inc., Westmont, Ill.

[21] Appl. No.: 747,906

[22] Filed: Jun. 24, 1985

[51] Int. Cl.⁴ .............................................. B01D 27/00
[52] U.S. Cl. ..................................... 222/189; 222/190;
210/120; 210/136; 210/257.1; 210/416.3;
210/472
[58] Field of Search ...................... 222/189, 190, 129.1,
222/146.6; 210/120, 136, 257.1, 416.1, 416.3,
436, 482, 472; 62/308, 392

[56] References Cited

U.S. PATENT DOCUMENTS

| | | | |
|---|---|---|---|
| 1,918,980 | 7/1933 | Nugent | 210/436 X |
| 2,082,322 | 6/1937 | Brundage | 210/457 X |
| 2,337,470 | 12/1943 | Hill | 210/436 |
| 2,851,164 | 9/1958 | Morino | 210/436 UX |
| 3,056,503 | 10/1962 | Roosa | 210/436 X |
| 3,539,009 | 11/1970 | Kudlaty | 210/257.1 X |
| 3,802,563 | 4/1974 | Sasaki et al. | 210/120 |
| 3,901,808 | 8/1975 | Bokros | 210/436 X |
| 4,190,426 | 2/1980 | Ruschke | 210/436 X |
| 4,491,520 | 1/1985 | Jaye | 222/189 X |
| 4,529,512 | 7/1985 | Williamson et al. | 210/120 |

Primary Examiner—Joseph J. Rolla
Assistant Examiner—Frederick R. Handren
Attorney, Agent, or Firm—Frank R. Thienpont

[57] ABSTRACT

An improved fluid dispensing system for use in dispensing beverages including unitary fluid filter cartridge adapted to be immersed in fluid to be dispensed, the fluid filter cartridge including a cannister having inlet and outlet openings in the lower end thereof, a filter septum in the filter cartridge connected to the outlet, adsorptive material disposed in the cartridge, a check valve controlled vent opening in the upper end of the cannister, and a riser stack connected to the check valve controlled vent opening.

16 Claims, 2 Drawing Sheets

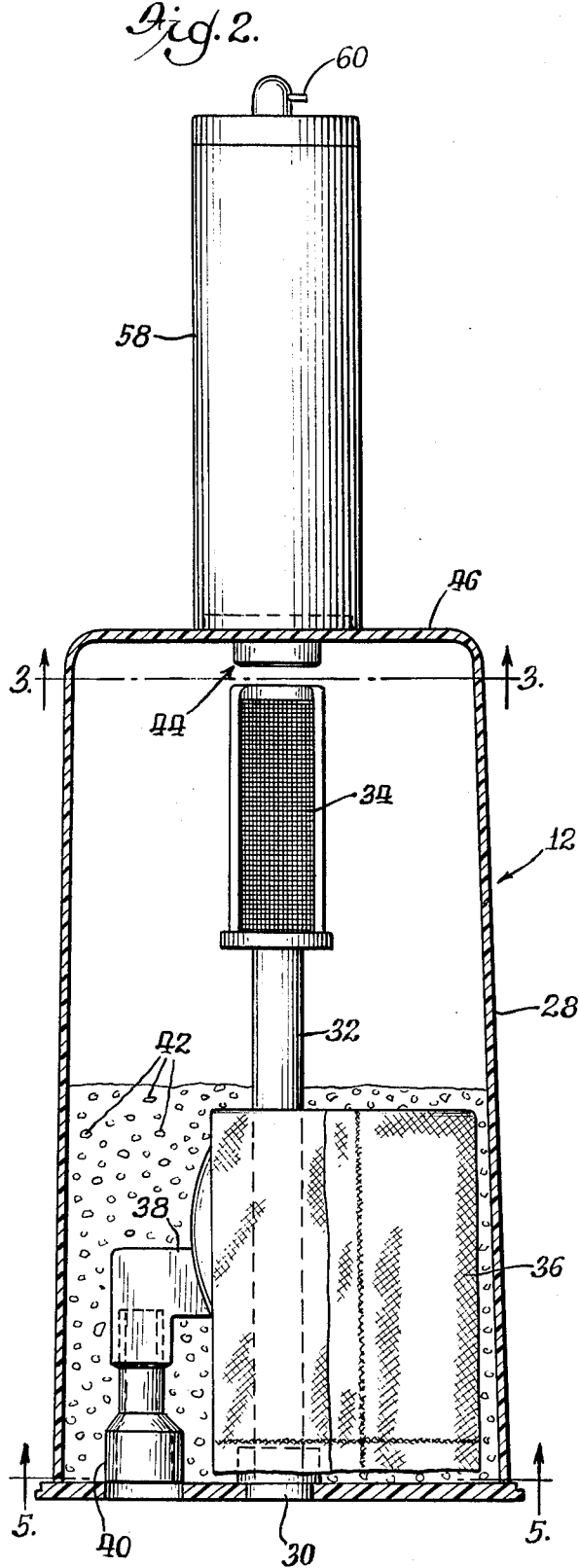
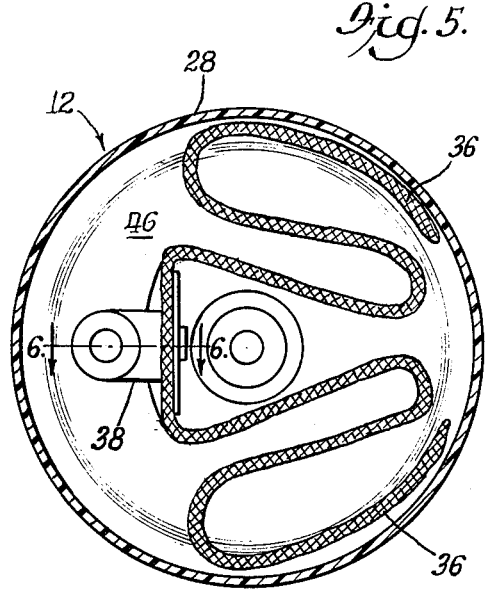
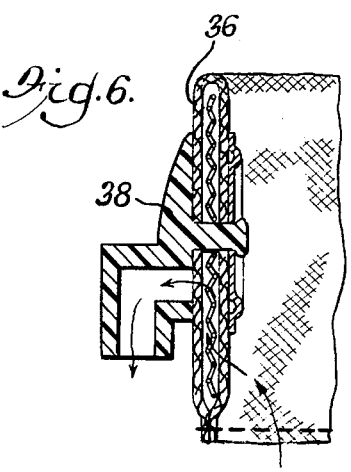

BEVERAGE DISPENSING SYSTEM AND FILTER CARTRIDGE THEREFOR

BACKGROUND OF THE INVENTION

This invention relates to beverage dispensing systems and particularly to filter cartridges for use in such a system.

It is desirable, of course, to utilize in the beverage which is to be dispensed from the beverage dispensing unit, water which is relatively free from a variety of contaminants which may be found in normal tap water. In order to accomplish this result a beverage dispensing system should contain some kind of a filter device. But the mere fact of providing a filter device does not in and of itself necessarily guarantee a completely satisfactory system. Other factors must be considered. These factors include, for example, the necessity of providing a carbonated beverage of uniform quality regardless of when beverage is dispensed from the unit, i.e., whether the beverage comes from a unit that has been standing inoperative for several hours such as standing overnight or whether it comes from a unit that has been frequently dispensing a beverage for the last several hours. Another factor is whether the water being used as an ingredient for the beverage comes from a reservoir that is substantially full or one that is almost empty. In other words will the last quart of water in the dispenser equipment yield as good a product as water from a substantially filled reservoir. The convenience of servicing the dispenser unit is another consideration.

Accordingly it becomes desirable to develop a beverage dispensing system which will incorporate features which deal with the aforementioned problems.

SUMMARY OF THE INVENTION

An object of this invention is to provide an improved fluid dispensing system which includes a filter cartridge immersed in the fluid to be dispensed and disposed upstream from the suction pump.

Another object of the invention herein is to provide a low cost replaceable filter cartridge which can be fitted conveniently into the reservoir from which fluid is being dispensed.

Another object is to provide in a filter cartridge a check valve controlled vent opening in the upper end of the cartridge for venting air from the cartridge as it is being filled with fluid and prevent excess air flowing into the cartridge as water is withdrawn from the reservoir in which the filter cartridge is disposed.

A still further object of this invention is to provide a filter cartridge constructed in such a manner that it can be positioned at the suction side of a pump but yet will allow free unobstructed flow through the filter cartridge without any appreciable pressure loss as the pump withdraws fluid from the reservoir and through the filter.

Another object of this invention is to provide an improved beverage dispensing system which will permit the introduction of relatively cool water into the carbonator to give improved carbonation.

The above objects and advantages will become more apparent from the following description when considered in conjunction with the accompanying drawings.

BRIEF DESCRIPTION OF THE DRAWINGS

FIG. 2 is an elevation view of the filter cartridge shown in FIG. 1;

FIG. 5 is a bottom plan view of the filter septum partially in section taken along line 5—5 of FIG. 2; and FIG. 6 is an elevation view in section of the filter septum taken along line 6—6 of FIG. 5.

DESCRIPTION OF PREFERRED EMBODIMENT

Figure 1:
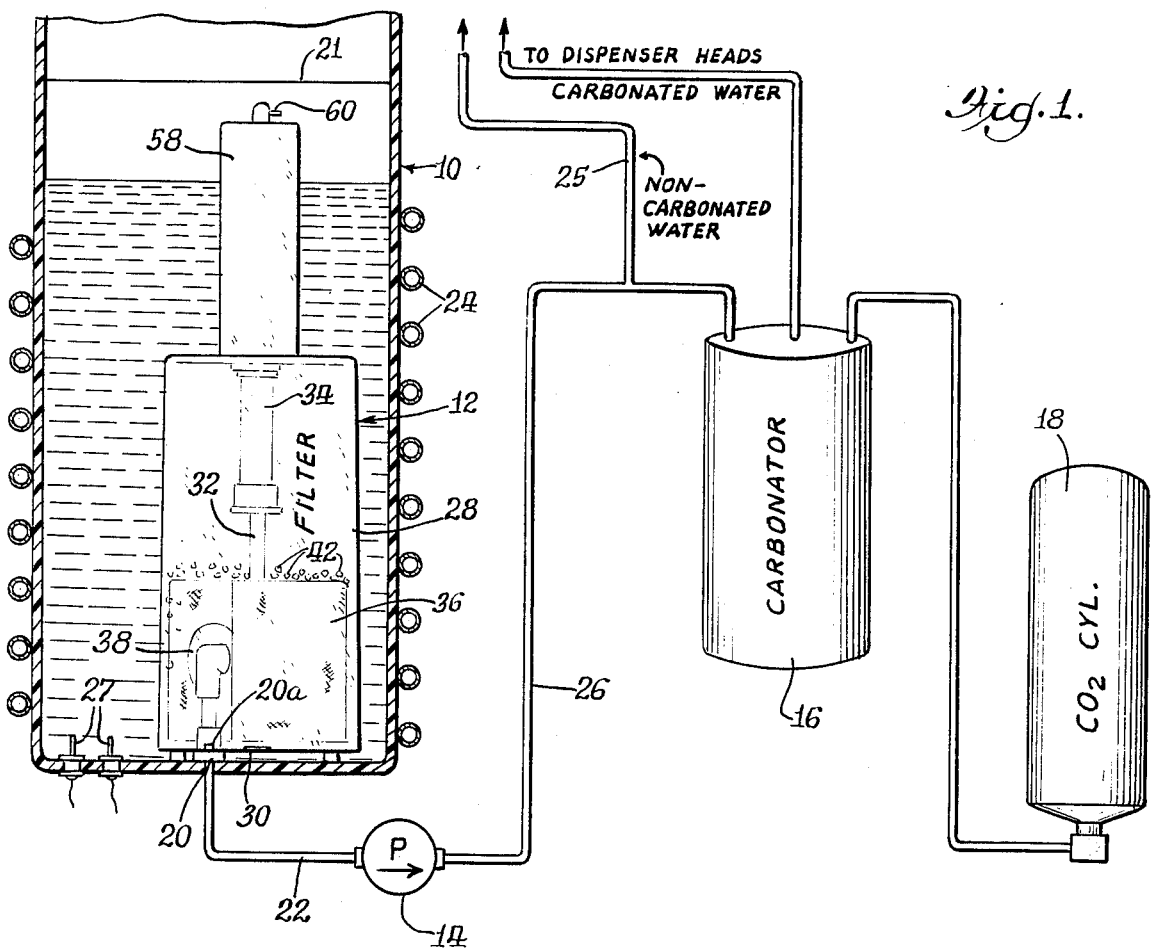
FIG. 1 is a diagram of a portion of the fluid dispensing system and showing a fluid filter disposed in a reservoir of the system.
Figure 3:
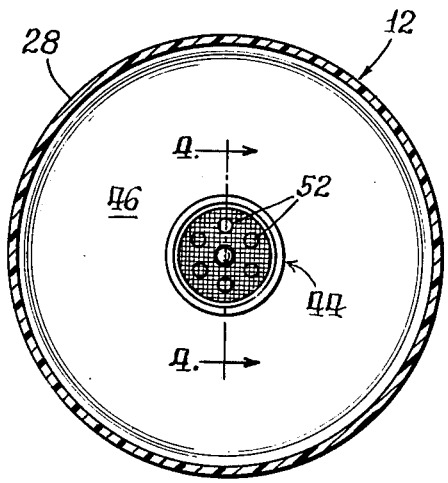
FIG. 3 is a bottom plan view partially in section taken along line 3—3 of FIG. 2.
Figure 4:
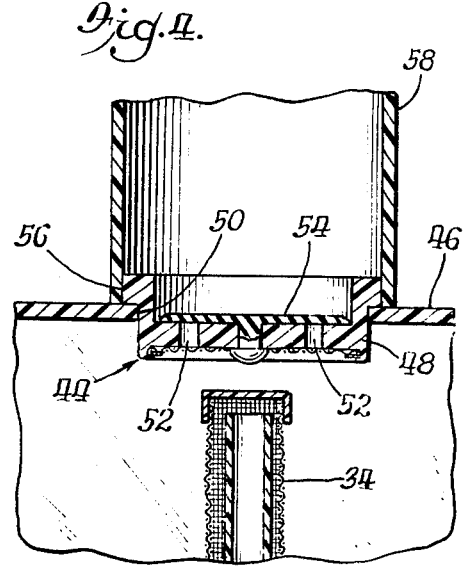
FIG. 4 is an enlarged partial view in elevation of a check valve arrangement positioned in the upper end of the filter cartridge of FIG. 2.

The beverage dispensing system described herein includes generally a water containing reservoir 10, a filter cartridge 12 disposed in the reservoir, a pump 14, a carbonator unit 16, a $CO_2$ cylinder 18, a number of dispenser heads (not shown) adapted to dispense selectable flavored non-carbonated and carbonated beverages, and a plurality of flavoring syrup containers (not shown).

The beverage dispensing system embodying the invention herein may be incorporated into a unit which is small enough to be relatively portable so that it can be used in offices and other small places.

The reservoir 10 may be a small, open, non-pressurized tank designed to hold 1-2 gallons of fluid such as tap water or other suitable drinking water which will become an ingredient of the beverage being dispensed. An outlet 20 is provided in the bottom of the reservoir to which suction pump 14 is connected by conduit 22. Means also may be provided for refrigerating the fluid contents of the reservoir 10 including a compressor (not shown) appropriately connected, for example, to a refrigerating coil 24 surrounding the reservoir 10. A removable cover 21 also may be provided for the reservoir. The reservoir can be filled by hand.

The pump 14 draws water from the reservoir 10 and sends it to the carbonator 16 via conduit 26. Sensor probes 27 may be provided in the bottom of reservoir 10 and electrically connected to the pump 14 to automatically shut off the pump when the level of water in the reservoir reaches a predetermined low level. Means such as sensor probes also are provided in the carbonator to automatically start the pump 14 when the carbonator needs filling and to automatically shut off the pump when the carbonator is filled to capacity. Operation of a non-carbonated beverage line 25 may be separately controlled. Normally a dispensing system of this type would include a pump but it will be appreciated that the system could work by gravity provided that the reservoir is appropriately located relative to the dispenser heads, i.e., above the dispenser heads to supply a pressure head to the dispenser units.

The $CO_2$ cylinder 18 is appropriately connected to the carbonator in a well known manner to supply $CO_2$ as needed to the refrigerated water in the carbonator to produce carbonated water.

The filter cartridge 12 includes a cannister 28 preferably made of plastic, an inlet 30 formed in the bottom of the cannister, and an inlet tube 32 connected to inlet 30 and extending upwardly into the cannister and open at its upper end. A strainer 34 preferably in the form of a tubular screen unit is attached to the inlet tube 32 at its upper end to prevent foreign particles such as particles of adsorptive media from entering the inlet tube. A filter septum 36 is disposed in the bottom of the cannister. One type of filter may be one made of a woven or nonwoven filter material formed into an elongated bag-like form which is folded into an accordion pleat arrangement as best shown in FIG. 5. The filter material for the septum is chosen to provide relatively free flow of water therethrough. Other types of filter septums may be used and may be made e.g., of porous plastic material. The filter septums also may be made in different shapes. An outlet fitting 38 is attached to the filter septum 36. It is designed to fit over an outlet tube 40 connected to the bottom of the cannister 28 and which in turn is designed to fit by a press fit over an outlet tube 20a which is part of the outlet 20 from reservoir 10.

A quantity of adsorptive material 42, preferably a granular carbon, is disposed in the cannister 28 and it occupies approximately one-third to three-quarters of the cannister volume. The adsorptive material surrounds and envelops the filter septum 36 so that water being filtered flows by gravity through both the adsorptive material and the filter septum. The adsorpive material is selected to permit free flow therethrough.

The filter is designed to deal with the multitude of contaminants which are found in waters at hundreds of different localities in which these beverage dispensing systems may be used. These contaminants may include, for example, excess chlorine in the water, hydrogen sulfide, turbidity as a result of suspended particles of various kinds in the water and a variety of objectionable tastes. These contaminants affect the taste, clarity and general purity of the water and accordingly would affect the beverage in which it is used unless appropriately removed by an appropriate filter unit. Thus the filter is designed to remove these objectionable contaminants consistent with allowing free flow of water through the filter.

An air relief check valve assembly 44 is positioned in the upper end wall 46 of the filter cartridge. This check valve assembly 44 comprises an annular cup-like plug 48 which is press-fitted or otherwise secured into opening 50 of the upper end wall 46. A plurality of circumferentially spaced vent openings 52 are formed in the plug 48. A check valve 54 is associated with the vent openings 52. While several types of check valves could be used we have found that an umbrella type check valve is particularly suitable in this environment. The check valve 54 is an umbrella type check valve made in the form of a thin rubber disc which is secured to the plug at the center thereof and overlies the openings 52. The vent openings 52 permit air to be vented from the cannister 28 as the cannister fills with fluid when the reservoir 10 is being filled, the rubber disc check valve being flexible enough to bend upwardly and permit passage of air out of the cannister through the openings 52. As water in the dispensing system is being used and the water level in the cannister recedes the check valve 54 prevents air from being drawn into the cannister. The plug 48 may be formed at its upper end with a shoulder 56 to which a riser stack is attached.

A tube-like riser 58 is connected to the end wall 46 of the cannister and is associated with the air vent openings 52. The riser stack may be secured to the shoulder 56 by suitable means such as by sonic welding, with an adhesive or may be otherwise secured to the end wall 46. An opening 60 is formed at the upper end of the riser stack to permit air to escape which is vented from the cannister into the riser stack. The riser stack is of such length that when the filter cartridge is in place in the reservoir 10, the opening 60 in the upper end of the riser stack lies above the maximum level of water in the reservoir. The riser stack protects the check valve and also prevents water from pushing down on the check valve as the reservoir is being filled. This allows air to escape more easily from the filter cartridge during filling of the reservoir.

As the water in the reservoir is being used, the column of water in the riser stack stays and helps to seat the check valve.

Several factors contribute to providing a superior dispensing system which will provide a quality beverage. The cooler the water the better will be the taste of the beverage. The cooler the water flowing to the carbonator the better the carbonation will be. In this arrangement embodying the invention herein the filter cartridge is immersed in the very fluid which ultimately becomes part of the beverage. The advantage of this arrangement is that the fluid being pumped into the carbonator or the dispensing head is at a desirable cool temperature. This is distinguished from an arrangement in which the pump might draw fluid from a reservoir and then downstream send it through a filter which is exposed to the ambient temperatures thus adding heat to the fluid before it reaches the carbontator. Thus better carbonation occurs with the cooler water being provided directly to the carbonator by the pump.

The filter cartridge is seated close to the bottom of the reservoir so that the inlet to the filter cartridge is kept submerged at all times thus preventing air from being pulled into the cartridge during operation.

The filter cartridge has the advantage of being easily replaceable. It needs only to have its outlet seated on the outlet tube from the reservoir, preferably by a press fit arrangement. No tools are required for insertion of the filter cartridge into or removal of the filter cartridge from the reservoir of the dispensing system.

While the operation of the dispensing system should be apparent from the above description a summary of the operation will now be provided. With the filter cartridge 12 in place in the reservoir 10, the reservoir is filled with water. As the reservoir is being filled, water enters the inlet 30 and inlet tube 32 of the filter cartridge 12. As water fills the filter cartridge 12, air in the filter cartridge is expelled therefrom through vent openings 52 and past the check valve 54. As the water level in the reservoir rises toward the reservoir maximum capacity point, it also rises in the riser stack 58 expelling the air therefrom. Once the water in the reservoir has been cooled it is ready to be pumped. $CO_2$ is provided in a well known manner to the carbonator as needed. The carbonated or non-carbonated water may then be withdrawn by operating one of the dispenser heads where the water is appropriately mixed with a selected flavoring syrup. In the process of refilling the carbonator or to provide non-carbonated drink, water is withdrawn from the reservoir by the pump 14 through the granular carbon adsorptive material 42, through the filter septum 36, through outlet fitting 38 and through outlet tube 40. It is important that an unobstructed flow of water through the filter cartridge be maintained, and to that end the adsorptive material is selected to permit such flow. In addition the filter septum is made of a porous material to further assure such unobstructed flow and help to prevent pump cavitation. When the water level in the reservoir recedes to a certain predefined minimum level the pump 14 is automatically shut off through action of the probes 27. As the water in the reservoir 10 recedes below the upper end wall 46 of the cartridge 12 the check valve 54 will remain closed and will be assisted in maintaining a closed position by the column of water remaning in the riser stack 58. This helps to assure that undesirable air does not enter the cartridge and contribute to pump cavitation. The unitary disposable filter cartridge may be easily replaced simply by lifting it from its fitting 20a on the bottom of the reservoir.

While a preferred embodiment of the invention has been disclosed, it will be appreciated that this is shown by way of example only, and the invention is not to be limited thereto as other variations will be apparent to those skilled in the art and the invention is to be given its fullest interpretation within the terms of the following claims.

What is claimed is:

1. In a fluid dispensing system the combination comprising:
    (1) a non-pressurized reservoir for containing fluid to be dispensed;
    (2) a fluid outlet disposed at the bottom of said reservoir;
    (3) a disposable filter cartridge disposed within said reservoir comprising:
        (a) a cannister having inlet and outlet openings formed in the lower end thereof;
        (b) said inlet opening in the bottom of said cannister being in fluid communication with said reservoir;
        (c) an inlet tube connected to said inlet opening and extending upwardly into said cannister, the upper end of said inlet tube being in fluid communication with the interior of said cannister;
        (d) filtering means disposed within said cannister;
        (e) vent opening means disposed in the upper end of said cannister to permit air to escape from the cannister;
        (f) a check valve associated with said vent opening means, said vent opening means being effective to allow air to escape from the cannister as the cannister fills with fluid and further effective to prevent air from entering the cannister during operation of the dispensing system withdrawing fluid from the reservoir; and
    (4) means connecting the outlet from said cannister to the outlet from said reservoir.

2. The combination of claim 1 wherein
said filtering means includes adsorptive media and a filter septum disposed within said cannister, and further includes
means connecting said filter septum to said outlet from said cannister.

3. The combination of claim 2 wherein
the adsorptive media is a granular carbon material and the filter septum is made of a porous material to allow easy flow through the filter during operation of the dispensing system.

4. The combination of claim 1 wherein
a fluid suction pump is connected to said outlet from the reservoir and positioned downstream therefrom.

5. The combination of claim 4 including
a carbonator unit connected to the discharge side of said pump.

6. The combination of claim 4 wherein
said filter cartridge is positioned upstream from said pump and is disposed in said reservoir so as to be immersed in the fluid which ultimately is dispensed by the dispensing system.

7. The combination of claim 1 including
a riser stack connected to the check valve controlled vent opening, said riser stack being constructed to have its open upper end positioned above the level of fluid in the reservoir when the latter is filled to its maximum capacity.

8. The combination of claim 1 wherein
the inlet opening to the filter cartridge is located at the lower end thereof to prevent air entering the filter cartridge.

9. A unitary disposable fluid filter cartridge adapted to be disposed within a fluid containing reservoir comprising:
    (a) a cannister having inlet and outlet openings formed in the lower end thereof;
    (b) an inlet tube connected to said inlet opening and extending into said cannister to provide fluid communication with the interior of said cannister;
    (c) filtering means disposed within said cannister;
    (d) vent opening means disposed in the upper end of said cannister for allowing air to escape from said cannister as fluid is introduced into the cannister through said inlet opening;
    (e) a check valve associated with said vent opening means which allows air to escape in one direction as the cannister is being filled with fluid and is effective to prevent air from entering the cannister in the other direction as the fluid is being used and exits through said outlet opening; and
    (f) a riser stack connected to the check valve controlled vent opening in the upper end of said canister, said riser stack being constructed and arranged to retain a column of liquid to impose a closing force on said check valve as fluid from the fluid containing reservoir is being used.

10. The fluid filter cartridge of claim 9 wherein said filtering means includes
    (a) adsorptive media disposed within said cannister, and
    (b) a filter septum disposed within said cannister, and further includes
    means connecting said filter septum to said cannister outlet opening.

11. The fluid filter cartridge of claim 10 wherein
said adsorptive media is granular carbon.

12. The fluid filter cartridge of claim 10 wherein
said adsorptive media is loosely packed to permit free flow of fluid therethrough.

13. The fluid filter cartridge of claim 10 wherein
the filter septum is constructed of porous material to permit easy flow of fluid therethrough.

14. The fluid filter cartridge of claim 9 wherein
said check valve is an umbrella type check valve.

15. The fluid filter cartridge of claim 9 including
strainer means attached to the upper end of said inlet tube to prevent contamination of the inlet water.

16. The fluid filter cartridge of claim 9 wherein
the cannister is made of a plastic.

* * * * *